(12) United States Patent
Romeo et al.

(10) Patent No.: US 6,987,467 B2
(45) Date of Patent: Jan. 17, 2006

(54) NAVIGATION AID FOR REFRESHABLE BRAILLE DISPLAY AND OTHER TEXT PRODUCTS FOR THE VISION IMPAIRED

(75) Inventors: Michael C. Romeo, Stuart, FL (US); Darryl O. Newberry, Stuart, FL (US); Brian Blazie, Stuart, FL (US)

(73) Assignee: Freedom Scientific, St. Petersburg, FL (US)

( * ) Notice: Subject to any disclaimer, the term of this patent is extended or adjusted under 35 U.S.C. 154(b) by 320 days.

(21) Appl. No.: 10/209,233

(22) Filed: Jul. 31, 2002

(65) Prior Publication Data

US 2003/0122689 A1 Jul. 3, 2003

Related U.S. Application Data

(60) Provisional application No. 60/309,275, filed on Aug. 1, 2001.

(51) Int. Cl.
*H03K 17/94* (2006.01)
*G09G 5/08* (2006.01)
*B41J 5/00* (2006.01)

(52) U.S. Cl. .......................... 341/22; 341/20; 345/168; 400/109.1

(58) Field of Classification Search ............ 341/20–22; 345/157–168; 400/106, 109.1
See application file for complete search history.

(56) References Cited

U.S. PATENT DOCUMENTS

| | | | |
|---|---|---|---|
| 4,687,444 A | 8/1987 | Garner | 434/114 |
| 4,985,692 A | 1/1991 | Breider et al. | 340/407 |
| 5,195,894 A | 3/1993 | le Blanc et al. | 434/114 |
| 5,293,464 A | 3/1994 | Hirano et al. | 395/101 |
| 5,461,399 A | 10/1995 | Cragun | 345/145 |
| 5,475,399 A | 12/1995 | Borsuk | 345/130 |
| 5,912,660 A | 6/1999 | Gouzman et al. | 345/163 |
| 6,046,722 A | 4/2000 | McKiel, Jr. | 345/145 |
| 6,157,369 A | 12/2000 | Merminod et al. | 345/157 |
| 6,159,013 A | 12/2000 | Parienti | 434/114 |
| 6,163,280 A | 12/2000 | Breider | 341/21 |
| 6,692,255 B2 * | 2/2004 | Roberts et al. | 434/113 |
| 6,776,619 B1 * | 8/2004 | Roberts et al. | 434/113 |

FOREIGN PATENT DOCUMENTS

| | | |
|---|---|---|
| DE | 19613318 | 7/1997 |
| DE | 20003668 U1 | 6/2000 |
| EP | 0 284 113 | 9/1988 |
| EP | 0967587 | 12/1999 |
| GB | 2359519 | 8/2001 |
| WO | WO 98/25252 | 6/1998 |
| WO | WO 98/43202 | 10/1998 |

\* cited by examiner

*Primary Examiner*—Michael Horabik
*Assistant Examiner*—Kimberly Jenkins
(74) *Attorney, Agent, or Firm*—Smith & Hopen, P.A.; Ronald E. Smith

(57) ABSTRACT

A navigation aid for a refreshable Braille display and similar products for the visually impaired. A navigation wheel is located adjacent at least one end of the refreshable Braille display. Rotation of the wheel by an increment moves the displayed text forward or backward by a predetermined increment, such as by one word, or one line or one paragraph. In a preferred embodiment, the function performed by rotating the wheel can be changed by depressing the wheel. A separate navigation wheel may be located at opposite ends of the refreshable Braille display and the two navigation wheels may perform the same or different functions when rotated.

11 Claims, 2 Drawing Sheets

NAVIGATION AID FOR REFRESHABLE BRAILLE DISPLAY AND OTHER TEXT PRODUCTS FOR THE VISION IMPAIRED

CROSS-REFERENCE TO RELATED APPLICATIONS

Applicants claim priority to U.S. Provisional Patent Application Ser. No. 60/309,275 filed Aug. 1, 2001.

STATEMENT REGARDING FEDERALLY SPONSORED RESEARCH OR DEVELOPMENT

Not Applicable.

TECHNICAL FIELD

The invention related to refreshable Braille displays for blind and low vision users, and more particularly for a navigation aid for a refreshable Braille display.

BACKGROUND OF THE INVENTION

For refreshable Braille displays, it has not been easy to position the cursor for advancing displayed text by one word, or one line, or one paragraph. For example, a Braille display user must move his or her hands between the Braille display and the keyboard until the desired cursor position is found. This can significantly slow the reading process. Frequently, the prior art navigation aids only allow movement of the text or cursor by only one fixed step at a time, namely, by one word at a time. Consequently, scrolling through text can be time consuming.

U.S. Pat. No. 6,163,280 shows a Braille display having a row of switches above and a row of switches below the row of Braille cells. The upper row of switches may, for example, position the displayed text and the lower row of switches may position a mouse cursor within text to be edited. The switches are designed to be operated with the same finger which is used to read the Braille cells. Consequently, the fingers must be moved from the displayed cell in order to operate the scrolling switches. The user also must touch the display cells to determine the position of the cursor.

Sliders provided with some refreshable Braille displays provide navigation speed, but have only a finite travel. Touching and moving a finger along the slider provides text navigation. For example, a six inch slider could easily navigate through a page containing 25 lines of text. Each line would require about one quarter inch of movement on the slider. But if the document has ten pages of text, each line would occupy only about 0.024 inch movement. Consequently, some degree of training and skill may be required to precisely advance the text.

It is known that a computer mouse may have a programmable navigation wheel. The navigation wheel has a mechanical detents. As the wheel is rotated between detents, a pulse is generated. It is known that the pulses may be used to advance the displayed text by a preselected number of lines. The navigation wheel also may be used to perform a programmed function when depressed, such as selecting a word or functioning as a double click of a mouse button. However, navigation wheels have not been used with Braille displays and the advantages of using a navigation wheel with a Braille display have not been appreciated.

As used herein, "text products for the vision impaired" includes not only refreshable Braille displays, but also notetakers, portable personal computer with a Braille display, and reading machines. A "notetaker" includes either a conventional keyboard or a Braille keyboard for entering data, a memory for storing entered data, and an output device. The output device may be a Braille display, or it may be in the form of an audible output device including a program for converting the stored text data to speech and either a speaker or an earphone for playing the speech. Or, the notetaker may include both a Braille display and an audible output. Vision impaired students, for example, frequently use a notetakers for taking notes in the classroom. Later the notes may be read or listened to. The notes also may be transferred to a personal computer for reviewing, editing and storage. Some notetakers are capable of using replaceable memory cards. Text such as a book may be stored on the card and the notetaker may be used for reading the text. Still another product for the vision impaired is the reading machine. Text such as a book may be stored on a tape, a CD or in a digital memory. The text is converted to audible speech. For each of these products, it has not been easy for a user to navigate or scroll through the text to a desired location.

BRIEF SUMMARY OF THE INVENTION

The invention is directed to a navigation aid for refreshable Braille displays and other text products for the vision impaired. The Braille display consists of a row of cells for displaying individual text characters. According to the invention, a rotary navigation wheel is located adjacent an end of the row of Braille cells and, preferably, a separate rotary navigation wheel is located adjacent each end of the row of Braille cells for navigating through text. Incremental rotation of the navigation wheel creates a pulse which moves the displayed text or a cursor either forward or backward, depending on the direction of rotation. When navigation wheels are provided at opposite ends of the row of Braille cells, the two wheels may be programmed to provide the same function or different functions.

Accordingly, it is an object of the invention to provide an improved navigation aid for refreshable Braille displays.

Other objects and advantages of the invention will become apparent from the following detailed description of the invention and the accompanying drawings.

DETAILED DESCRIPTION OF THE INVENTION

The invention is directed to a navigation aid for refreshable Braille displays and other text products for the vision impaired. The Braille display consists of a row of cells for displaying individual text characters. According to the invention, a rotary navigation wheel is located adjacent an end of the row of Braille cells and, preferably, a separate rotary navigation wheel is located adjacent each end of the row of Braille cells for navigating through text. The navigation wheels may be aligned with the axis of the row of Braille cells, or, preferably, located above or below the axis of the row of Braille cells. By offsetting the navigation wheels form the axis of the row of Braille cells, the user may continuously read displayed text without risk that the hand which is reading will bump into the navigation wheels.

Figure 1:
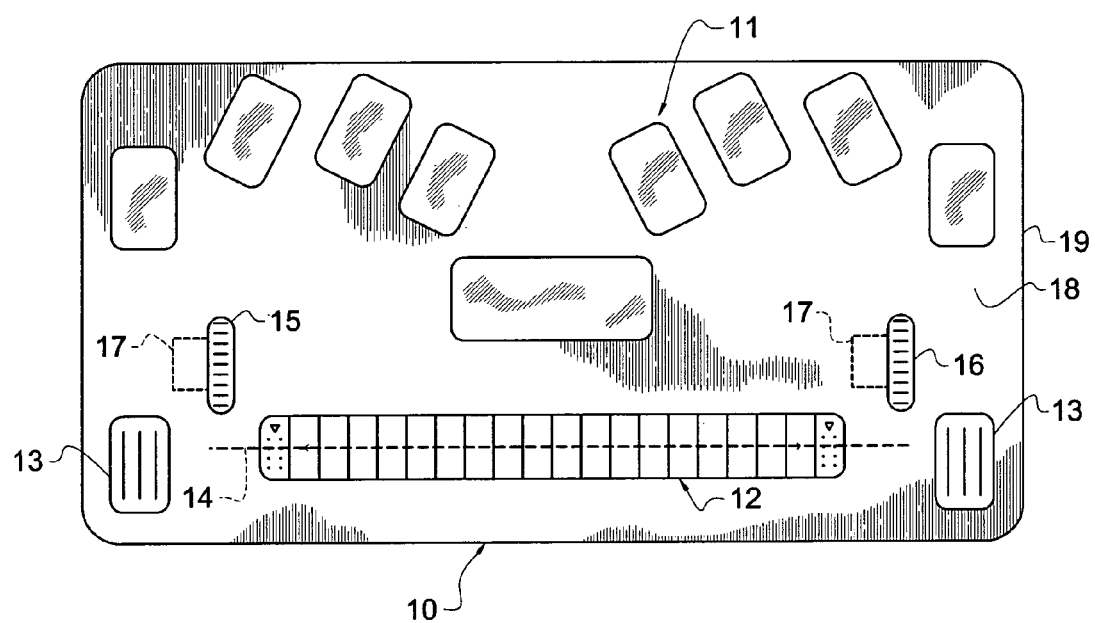
FIG. 1 is a top plan view showing an exemplary keyboard of a Braille notetaker with a refreshable Braille display and including two navigation wheels according to the invention.

Referring to the drawings, FIG. 1 is a top plan view of an exemplary notetaker 10 having a Braille keyboard 11, a 20 cell Braille display 12, and two speakers 13. The Braille display 12 has an axis 14. The notetaker 10 includes a program controller in the form of a computer and a digital memory for storing text data entered through the keyboard 11 and for causing the Braille display 12 to display the stored data one line at a time. The notetaker 10 also can include known software for converting the stored text to speech for driving the speakers 13. Notetakers 10 of this type are commercially available products commonly used by blind and low vision users.

According to the invention, a first navigation wheel 15 according to the invention is positioned adjacent to the left end of the Braille display 12 and above the axis 14, and a second navigation wheel 16 is positioned adjacent to the right end of the Braille display 12 and above the axis 14. Alternately, the navigation wheels 15 and 16 may be adjacent the ends of the Braille display 12 aligned on the axis 14, or below the axis 14. It should be appreciated that the notetaker 10 may be constructed with a different number of Braille cells in the display 12, and that the keyboard 11 may have different configurations or may be a conventional QUERTY keyboard. It also should be appreciated that only a single navigation wheel 15 or 16 may be provided and that its position may be varied to meet the needs of users of the notetaker 10.

Figure 2:
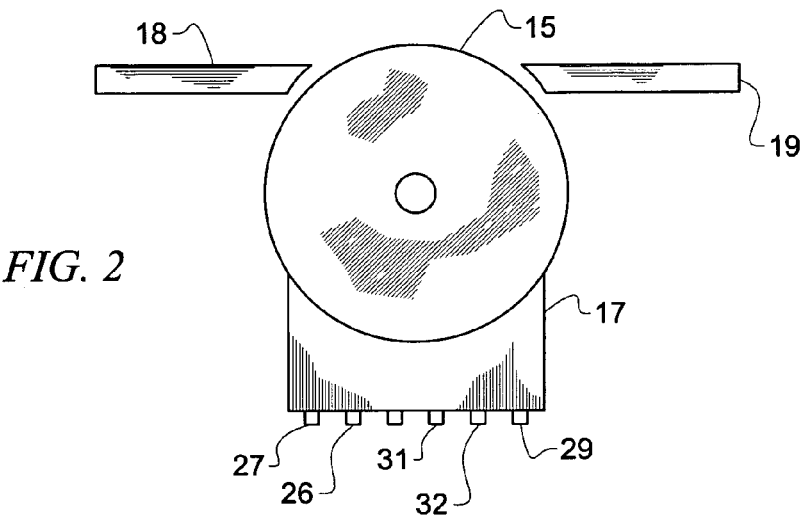
FIG. 2 is a fragmentary cross sectional views showing details of an exemplary navigation wheel and an attached encoder according to one aspect of the invention.

As shown in FIGS. 1 and 2, the navigation wheel 15 is attached to an encoder 17 and is mounted to project through the top surface 18 of a housing 19 for the notetaker 10 or other text device. The navigation wheel may be, for example, a commercially available edge drive jog encoder, such as a type EVQWK encoder manufactured by Panasonic. The wheel 16 will be attached to a similar encoder (not shown). It will be appreciated that other commercially available encoders also may be used with the navigation wheels 15 and 16.

Figure 3:
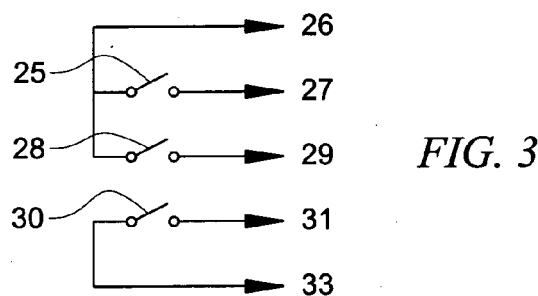
FIG. 3 is a schematic circuit diagram illustrating the outputs of the encoder.

Exemplary encoder 17 has three (3) switched outlets, as depicted in FIGS. 2 and 3. Switch 25 is connected in series with common terminal 26 and "A" terminal 27. Switch 28 is connected in series with common terminal 26 and "B" terminal 29. Switch 30 is connected in series with terminals 31 and 33. Switch 30 is actuated by depressing wheel 15. Wheel 15 is adapted to be depressed from a position of repose by application of a user-applied external force against it. A bias means, not depicted, returns wheel 15 to its position of repose after it has been depressed.

Figure 4:
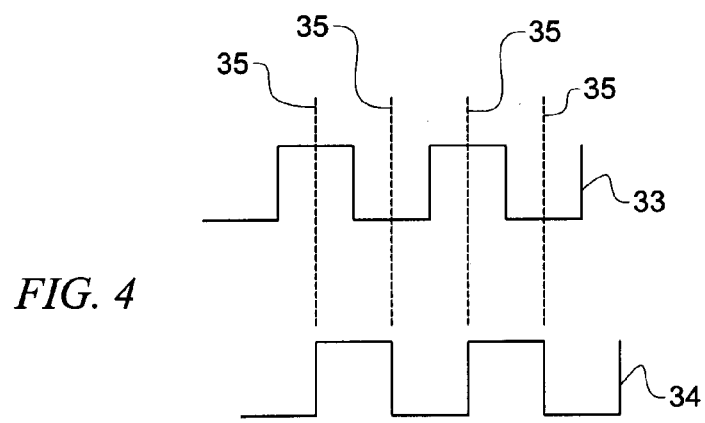
FIG. 4 is a graph illustrating the outputs of the two switches in the encoder as the navigation wheel is rotated.

Preferably, each incremental position of wheel 15 has a positive mechanical detent that can be felt by the user to provide feedback as to how far the displayed text or a cursor is moved. As a navigation wheel 15, 16 is rotated, the encoder generates a series of pulses (control signals), depicted in FIG. 4. Preferably, one pulse is produced for each detent. The pulses are produced by opening and closing two switches 25 and 28. Tn the exemplary encoder, a two phase quadrature output is produced with fifteen (15) pulses per revolution. The output of switch 25 is represented by line 33 and the output of switch 28 is represented by line 34. The wheel detents position wheel 15 at equilibrium points 35, depending on the position of wheel 15. The number of pulses per revolution may vary with the application. By providing a two phase quadrature output, information on the direction of rotation is provided in addition to the number of increments of rotation.

The navigation wheel is intended to be used in conjunction with a refreshable Braille display to facilitate navigation through text. In addition to use with a refreshable Braille display, the navigation wheel may be used with other text products for the visually impaired, such as with a personal digital assistant (PDA), with a portable computer, or with a Braille or speech output device such as reading machines and notetakers. The navigation wheel is designed to provide a means for a vision impaired user to rapidly scroll through a document or a dialog box stored in the computer's memory. The computer may be programmed so that rotation of the navigation wheel by one increment advances the displayed or spoken text or a cursor, for example, by one character, by one word, by one line of displayed text, by one paragraph, or by one page. By depressing the navigation wheel, the programmed operation mode of the navigation wheel may be changed. Where the computer or device connected to the navigation wheel produces synthesized speech, each time the mode is changed by depressing the wheel, the computer may be programmed to announce the newly selected mode. For example, if the navigation wheel is programmed in a mode for advancing the text by one displayed line of text per increment, pressing the wheel may switch to a mode where each increment advances by one paragraph. In response to the wheel depression, the computer may announce "paragraph". Then as the wheel is rotated, the text product may be programmed to announce the number of the paragraph in the text which is being displayed. Alternately, the text product may generate a tone which indicates the position in the text. The text product also may be programmed to audibly announce the selected location in the text, such as announcing the number of a selected paragraph or page, or announcing a word which is selected. For example, if the text product has the bible stored in its memory, the navigation wheel may be programmed for scrolling by line, chapter or verse, and the desired type of scrolling is selected by depressing the navigation wheel.

When two navigation wheels are provided, the computer may be programmed so that the second navigation wheel operates in the same mode as the first navigation wheel, or in a different mode. For example, a navigation wheel located to the right of the row of Braille cells may be programmed to advance the text by one displayed line. When the reader reaches the end of the displayed line of text, a simple rotation of the wheel adjacent the end of the line of cells by one increment will advance the displayed text to the next line. Rotation of one increment in a reverse direction moves the displayed text back by one line. A navigation wheel located to the left of the row of Braille cells may be programmed to select the displayed paragraph, or to move the cursor to a specific word in the displayed line so that the displayed text can be easily edited. Where the cursor is moved from word to word in the displayed text, the word selected by the cursor may be announced by the computer to further facilitate rapid navigation through the text by the vision impaired user. For each navigation wheel, the direction of rotation of the wheel determines the direction of movement through the document. Feedback to the user is provided through the Braille display, through audio tones, and/or through synthesized speech.

By providing separate navigation wheels at the opposite ends of the Braille display, the reading speed may be greatly increased. The user may use one hand for continuous reading the Braille display and the other hand for continuous document navigation. Consequently, the hand used for reading does not have to be removed from the Braille cells. Further, the Braille display may be read by either right handed or left handed users. This permits the Braille reader to increase his or her reading speed compared to existing devices and to scan a list much more quickly.

The programmed function of the switch operated by depressing the navigation wheel also may be varied. In one mode, depressing the navigation wheel may cause the product to say the current word. In another mode, the line and column number may be announced in response to depressing the navigation wheel, or the current word may be selected for editing.

The navigation wheels are an advance over prior products for use by the blind in navigating through text since they provide users both incremental and rapid scrolling capability. Navigation by keyboard can be quite slow, since it requires use of both hands. This is a serious disadvantage to a Braille user who must remove his hand from the Braille display to type on the keyboard and then return to the Braille display to read the new information. The additional function provided by pressing the wheel allows the user to take action at the current location without removing his or her hand from the wheel. The navigation wheel also is superior to a slider which cannot provide the infinite range of movement afforded by the navigation wheel.

It will be appreciated that various modifications and changes may be made to the above described preferred embodiment of a navigation aid for a refreshable Braille display without departing from the scope of the following claims.

What is claimed is:

1. A refreshable Braille display, comprising:
   a housing;
   a plurality of refreshable Braille cells mounted in a row in said housing for reading by a user using a finger moving along said row of cells between opposite first and second ends of said row;
   a first encoder mounted in said housing adjacent said first end of said row;
   a first rotatable wheel associated with said first encoder for causing said first encoder to generate at least one pulse each time said first rotatable wheel is rotated a predetermined increment, and;
   a programmable controller adapted to operate said Braille cells to display text and to scroll the displayed text by a predetermined amount in response to said at least one pulse when said first rotatable wheel is rotated trough said predetermined increment.

2. The refreshable Braille display of claim 1, further comprising:
   said first encoder adapted to produce two out-of-phase pulse signals as said first rotatable wheel is incrementally rotated, and
   said programmable controller being adapted to scroll text displayed on said Braille cells in a first direction when said first rotatable wheel is rotated in a first direction and to scroll text displayed an said Braille cells in a second direction opposite to said first direction when said first rotatable wheel is rotated in said second direction.

3. The refreshable Braille display of claim 2, further comprising:
   said first rotatable wheel including a plurality of detents which are felt by a user each time said first rotatable wheel is rotated through a predetermined increment.

4. The refreshable Braille display of claim 3, further comprising:
   a second rotatable wheel and a second encoder mounted at said second end of said row of Braille cells.

5. The refreshable Braille display of claim 4, further comprising:
   said first and second rotatable wheels adapted to be depressed relative to a position of repose by a user exerting force thereagainst;
   said first and second encoders including a first and second encoder switch, respectively, adapted to generate a pulse when actuated by depressing the rotatable wheel associated wit said encoder;
   said programmable encoder adapted to change the increment in which text is scrolled in response to said pulse from either said first or second encoder switches.

6. The refreshable Braille display of claim 5, further comprising:
   said programmable controller being a notetaker including a program controlled computer having a memory,
   a keyboard for entering text data into said memory.

7. A refreshable Braille display, comprising:
   a plurality of Braille cells arranged in a row and adapted to display a line of text;
   a first encoder located adjacent a first end of said row of cells;
   a rotatable navigation wheel connected to said first encoder;
   said first encoder adapted to generate control signals when said navigation wheel is rotated; and
   a programmable controller adapted to display a first row of Braille characters in said row of Braille cells in response to receipt of a first control signal from said first encoder when said rotatable navigation wheel is in a first rotatable position; and
   said programmable controller adapted to display a second row of Braille characters in said row of Braille cells in response to receipt of a second control signal from said first encoder when said rotatable navigation wheel is in a second rotatable position.

8. A refreshable Braille display according to claim 7, further comprising:
   said navigation wheel having a plurality of detents which are felt by a user when said rotatable navigation wheel is rotated through a predetermined increment;
   said first encoder generating a predetermined control signal when said navigation wheel is rotated through said predetermined increment.

9. A refreshable Braille display according to claim 8, further comprising:
   said first encoder adapted to generate a first predetermined control signal when said navigation wheel is rotated in a first direction through a predetermined increment and a second predetermined control signal when said navigation wheel is rotated in a second direction opposite to said first direction through a predetermined increment.

10. A refreshable Braille display according to claim 7, further comprising:
    a second encoder located adjacent a second, opposite end of said row of cells;
    a second rotatable navigation wheel connected to said second encoder;
    said second encoder adapted to generate control signals when said navigation wheel is rotated;
    said programmable controller being controlled by said control signals generated by said first encoder and said second encoders.

11. The refreshable Braille display according to claim 7, further comprising:
said rotatable wheel adapted to be depressed from a position of repose when an external force is applied to it by a user;
said first encoder including a first encoder switch adapted to generate a first control signal when actuated by depressing the rotatable wheel associated wit said first encoder;
said programmable encoder adapted to change the increment in which text is scrolled in response to said control signal.

* * * * *